US011421786B2

United States Patent
Li et al.

(10) Patent No.: US 11,421,786 B2
(45) Date of Patent: Aug. 23, 2022

(54) MAGNETIC FLUID SEALING DEVICE FOR OSCILLATING SHAFT

(71) Applicant: Tsinghua University, Beijing (CN)

(72) Inventors: Decai Li, Beijing (CN); Zhenghao Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/548,284

(22) Filed: Dec. 10, 2021

(65) Prior Publication Data

US 2022/0205543 A1    Jun. 30, 2022

(30) Foreign Application Priority Data

Dec. 24, 2020   (CN) .......................... 202011546357.1

(51) Int. Cl.
    *F16J 15/43*    (2006.01)
(52) U.S. Cl.
    CPC ..................................... *F16J 15/43* (2013.01)
(58) Field of Classification Search
    CPC ...................................................... F16J 15/43
    See application file for complete search history.

(56) References Cited

U.S. PATENT DOCUMENTS

| | | | | |
|---|---|---|---|---|
| 3,075,370 A | * | 1/1963 | Leonard | F16D 3/848 464/171 |
| 4,171,818 A | * | 10/1979 | Moskowitz | F16J 15/324 277/553 |
| 4,664,393 A | * | 5/1987 | Hazebrook | F16D 3/227 277/912 |
| 4,672,965 A | * | 6/1987 | Baum | A61B 17/320016 606/172 |
| 5,007,881 A | * | 4/1991 | Hazebrook | F16D 3/848 464/170 |
| 5,346,431 A | * | 9/1994 | Okuyama | F16D 3/848 464/171 |

(Continued)

FOREIGN PATENT DOCUMENTS

| | | |
|---|---|---|
| CN | 201982480 | 9/2011 |
| CN | 102537367 | 7/2012 |

(Continued)

OTHER PUBLICATIONS

CNIPA, First Office Action for CN Application No. 202011546357.1, dated Aug. 9, 2021.

(Continued)

*Primary Examiner* — Vishal A Patel
(74) *Attorney, Agent, or Firm* — Hodgson Russ LLP

(57) ABSTRACT

A magnetic fluid sealing device for an oscillating shaft includes a housing, the oscillating shaft, a first seal, a second seal, and a magnetic source. The housing includes a ball head, and a ball hinge is arranged within the housing. The oscillating shaft is swingable with the ball hinge as a center. The first seal and the second seal are arranged on both sides of the ball head. The first seal includes a first toothed ring, and the second seal includes a second toothed ring. Magnetic fluid is filled at sealing gaps between the first and second toothed rings and the ball head. The magnetic source generates a magnetic field along an axial direction of the oscillating shaft.

10 Claims, 6 Drawing Sheets

(56) References Cited

U.S. PATENT DOCUMENTS

| | | | |
|---|---|---|---|
| 2003/0201609 A1 | 10/2003 | Hood et al. | |
| 2018/0023661 A1* | 1/2018 | Early | F16C 35/077 74/572.11 |
| 2020/0309270 A1* | 10/2020 | Yang | F16J 15/43 |

FOREIGN PATENT DOCUMENTS

| | | |
|---|---|---|
| CN | 102889560 | 1/2013 |
| CN | 203463483 | 3/2014 |
| CN | 210716205 | 6/2020 |
| DE | 50213801 | 10/2009 |
| GB | 1052562 | 12/1966 |
| JP | 2000002339 | 1/2000 |
| JP | 2008151290 | 7/2008 |
| KR | 20200094358 | 8/2020 |

OTHER PUBLICATIONS

CNIPA, Notification to Grant Patent Right for Invention for CN Application No. 202011546357.1, dated Nov. 24, 2021.

\* cited by examiner

MAGNETIC FLUID SEALING DEVICE FOR OSCILLATING SHAFT

CROSS-REFERENCE TO RELATED APPLICATIONS

This application claims benefit of and priority to Chinese Patent Application Serial No. 202011546357.1, filed on Dec. 24, 2020, the entire content of which is incorporated herein by reference.

FIELD

The present disclosure relates to the field of mechanical engineering seals and, more particularly, to a magnetic fluid sealing device for an oscillating shaft.

BACKGROUND

Oscillating shafts are shafts that can swing in any direction around a fixed point and are key structures in mechanical transmissions and actuators, and have important applications in oscillating cylinders, automotive suspension control arms, engine vectoring oscillating nozzles, universal joints, and other fields.

However, it has been a technical challenge to seal the oscillating shafts with high performance and high reliability since the oscillating shafts can move in any direction. In the related art, the oscillating shafts mostly use rubber rings as sealing materials, but sealing with the rubber rings has the following problems that the oscillating shafts work with high frictional resistance, debris generated by rubber wear pollutes inner and outer cavities, and the rubber wears easily or fails with aging, making zero leakage impossible.

SUMMARY

A magnetic fluid sealing device for an oscillating shaft according to embodiments of the present disclosure includes a housing, the oscillating shaft, a first seal, a second seal, and a magnetic source. The housing includes a ball head with a spherical inner surface and a spherical outer surface, the ball head has an opening, and a ball hinge is arranged within the housing. The oscillating shaft runs through the opening and has an end coupled to the ball hinge, and the oscillating shaft is swingable with the ball hinge as a center. The first seal is arranged on an outer side of the ball head, a side surface of the first seal adjacent to the ball head is spherical, the first seal shares a common center of sphere with the ball head and is coupled to the oscillating shaft, the first seal includes a first toothed ring arranged continuously along a peripheral direction of the first seal on a side of the first seal adjacent to the ball head, a first sealing gap exists between the first toothed ring and the ball head, and magnetic fluid for sealing is filled in the first sealing gap. The second seal is arranged on a side of the ball head away from the first seal, a side surface of the second seal adjacent to the ball head is spherical, the second seal shares a common center of sphere with the ball head and is coupled to the oscillating shaft, the second seal includes a second toothed ring arranged continuously along a peripheral direction of the second seal on a side of the second seal adjacent to the ball head, a second sealing gap exists between the second toothed ring and the ball head, and the magnetic fluid for sealing is filled in the second sealing gap. The magnetic source is arranged on the oscillating shaft and located between the first seal and the second seal, and the magnetic source generates a magnetic field along an axial direction of the oscillating shaft.

DETAILED DESCRIPTION OF EMBODIMENTS

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

Figure 1:
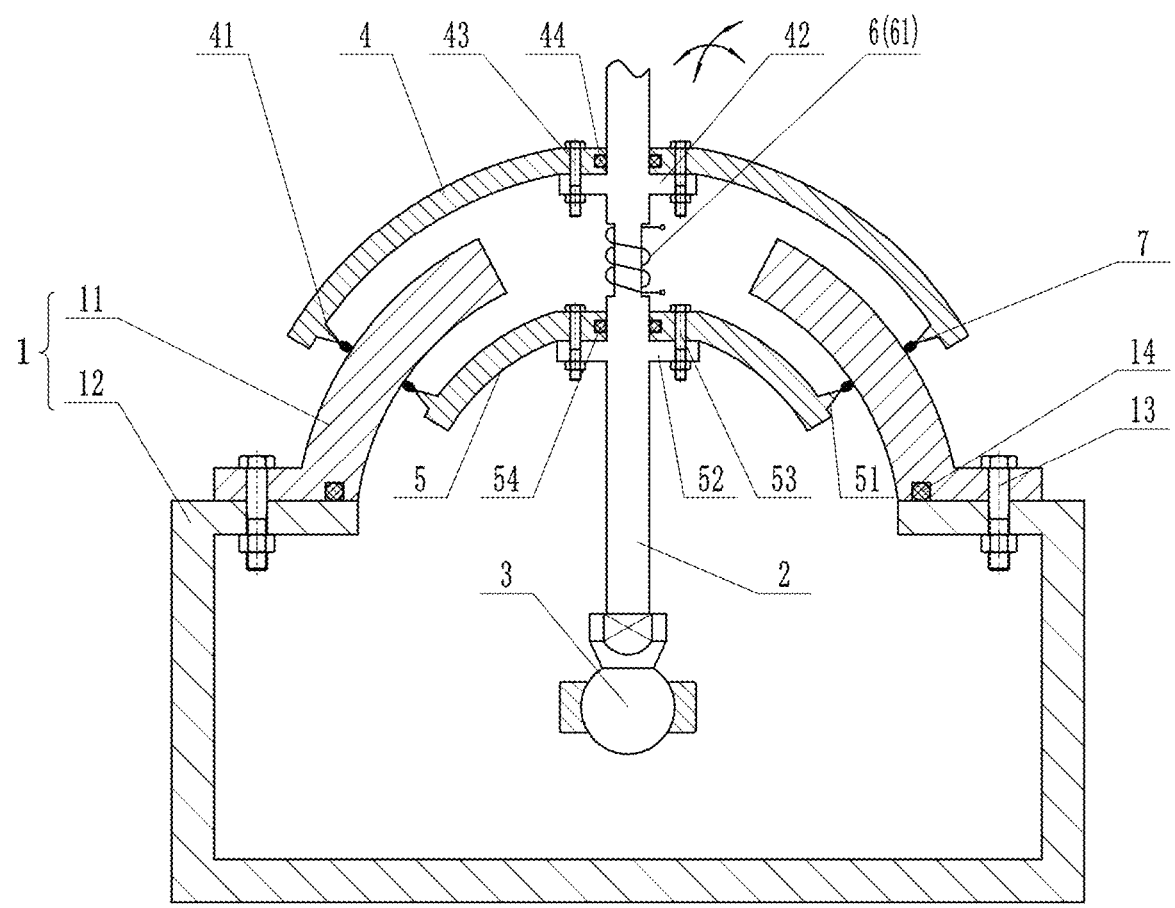
FIG. 1 is a schematic diagram of a magnetic fluid sealing device for an oscillating shaft according to embodiments of a first aspect of the present disclosure.

As shown in FIG. 1, a magnetic fluid sealing device for an oscillating shaft according to embodiments of the present disclosure includes a housing 1, an oscillating shaft 2, a first seal 4, a second seal 5, and a magnetic source 6.

The housing 1 includes a ball head 11. Inner and outer surfaces of the ball head 11 are spherical, and the ball head 11 has an opening. The housing 1 includes a ball hinge 3 therein. The oscillating shaft 2 passes through the opening of the ball head 11, and an end of the oscillating shaft 2 is coupled to the ball hinge 3. The oscillating shaft 2 can swing in any direction with the ball hinge 3 as a center within the opening.

The first seal 4 is arranged on an outer side of the ball head 11, and a side surface of the first seal 4 adjacent to the ball head 11 is spherical. The second seal 5 is arranged on a side of the ball head 11 away from the first seal 4, i.e., on an inner side of the ball head 11, and a side surface of the second seal 5 adjacent to the ball head 11 is spherical. Both the first seal 4 and the second seal 5 share a common center of sphere with the ball head 11, and both the first seal 4 and the second seal 5 are coupled to the oscillating shaft 2 and swing with oscillation of the oscillating shaft 2.

The first seal 4 includes a first toothed ring 41 arranged continuously along a peripheral direction of the first seal 4 on a side of the first seal adjacent to the ball head 11, and the second seal 5 includes a second toothed ring 51 arranged continuously along a peripheral direction of the second seal 5 on a side of the second seal 5 adjacent to the ball head 11. In other words, the first toothed ring 41 is arranged on an inner side of the first seal 4, and the second toothed ring 51 is arranged on an outer side of the second seal 5. There is a first sealing gap between the first toothed ring 41 and the ball head 11 and a second sealing gap between the second toothed ring 51 and the housing 1, and magnetic fluid 7 for sealing is filled in the first sealing gap and the second sealing gap.

Figure 2:
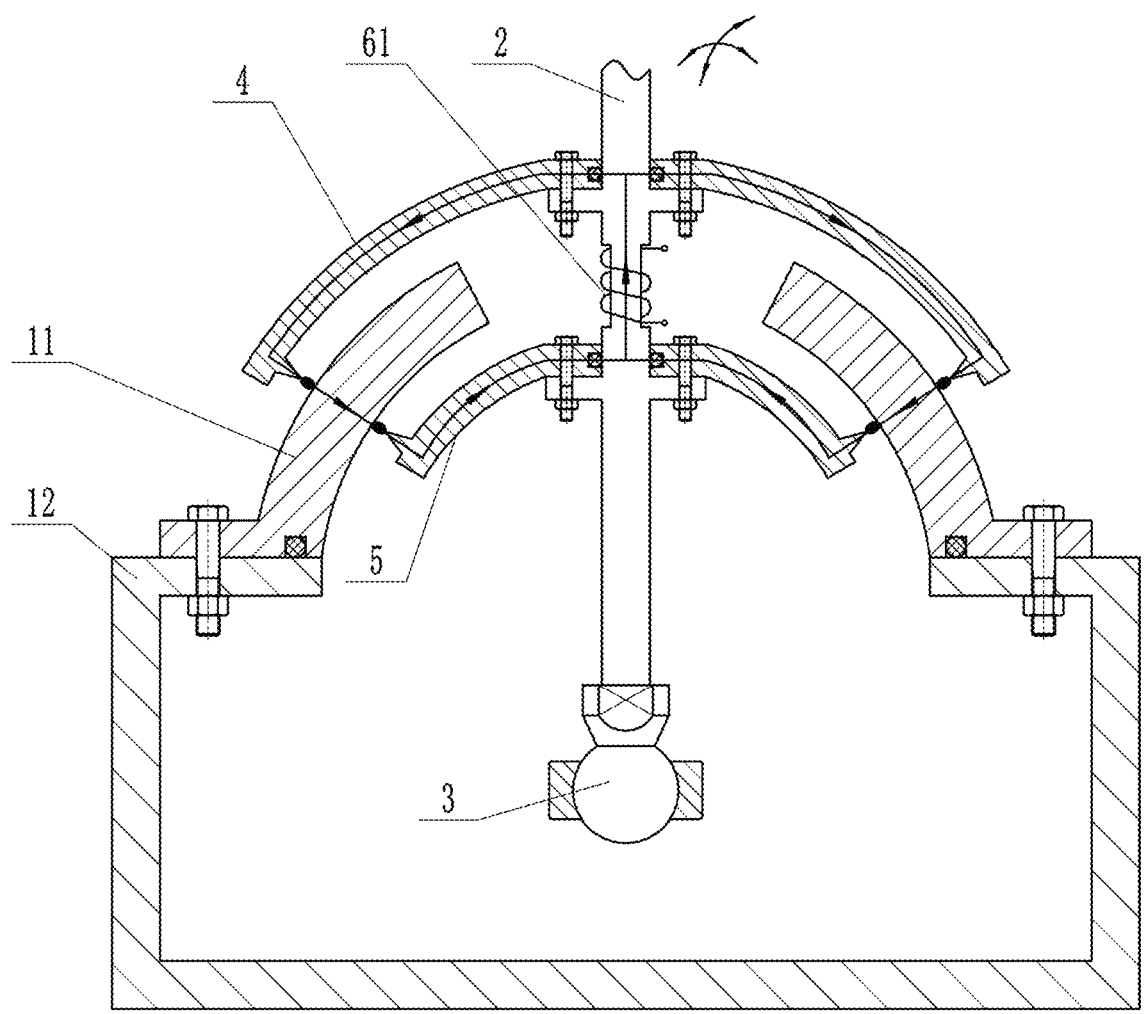
FIG. 2 is a schematic diagram of a magnetic circuit of the sealing device shown in FIG. 1.

As shown in FIG. 2, the magnetic source 6 is arranged on the oscillating shaft 2 and located between the first seal 4 and the second seal 5, and the magnetic source 6 is used to generate a magnetic field along an axial direction of the oscillating shaft 2. The materials of the ball head 11, the oscillating shaft 2, the first seal 4 and the second seal 5 are all magnetically conductive materials that can conduct a magnetic field. A direction of the magnetic field generated by the magnetic source 6 can be oriented toward either end of the oscillating shaft 2. The magnetic source 6, the oscillating shaft 2, the first seal 4, the first toothed ring 41, the magnetic fluid 7, the ball head 11, the second toothed ring 51, and the second seal 5 form a magnetic circuit. The magnetic fluid 7 in the sealing gaps is adsorbed at a top surface of teeth of the first toothed ring 41 and at a top surface of teeth of the second toothed ring 51 under the action of magnetic field force and is in contact with the outer and inner surfaces of the ball head 11. The magnetic fluid 7 is used as a sealing medium to achieve sealing and prevent leakage of a substance sealed in the housing 1.

The magnetic fluid sealing device for the oscillating shaft 2 according to the embodiments of the present disclosure can seal the oscillating shaft 2 with good sealing effect, strong pressure resistance and low leakage rate by arranging the first seal 4 and the second seal 5 on both sides of the ball head 11, respectively, and adsorbing the magnetic fluid 7 at the sealing gaps under the action of magnetic field force.

It should be noted that in some embodiments, cross-sectional shapes of the first toothed ring 41 and the second toothed ring 51 are triangular, which is due to the fact that a cross-sectional area of the first toothed ring 41 gradually decreases in a direction from the first seal 4 toward the ball head 11, and a cross-sectional area of the second toothed ring 51 gradually decreases in a direction from the second seal 5 toward the ball head 11. With such an arrangement, the first toothed ring 41 and the second toothed ring 51 have maximum magnetic field strength at their ends, producing the strongest adsorption effect on the magnetic fluid 7, and making the sealing more reliable.

In addition, the cross-sectional shapes of the first toothed ring 41 and the second toothed ring 51 may be trapezoidal, rectangular or the like, as long as the magnetic field strength at the first toothed ring 41 and the second toothed ring 51 is greater than the magnetic field strength at other locations.

As shown in FIG. 1, in some embodiments, the magnetic source 6 includes a coil 61 wound around the oscillating shaft 2 and located between the first seal 4 and the second seal 5. The coil 61 is energized to generate a magnetic field along the axial direction of the oscillating shaft 2 and forms a magnetic circuit through the first seal 4, the first toothed ring 41, the magnetic fluid 7, the ball head 11, the magnetic fluid 7, the second toothed ring 51, the second seal 5, and the oscillating shaft 2.

Figure 4:
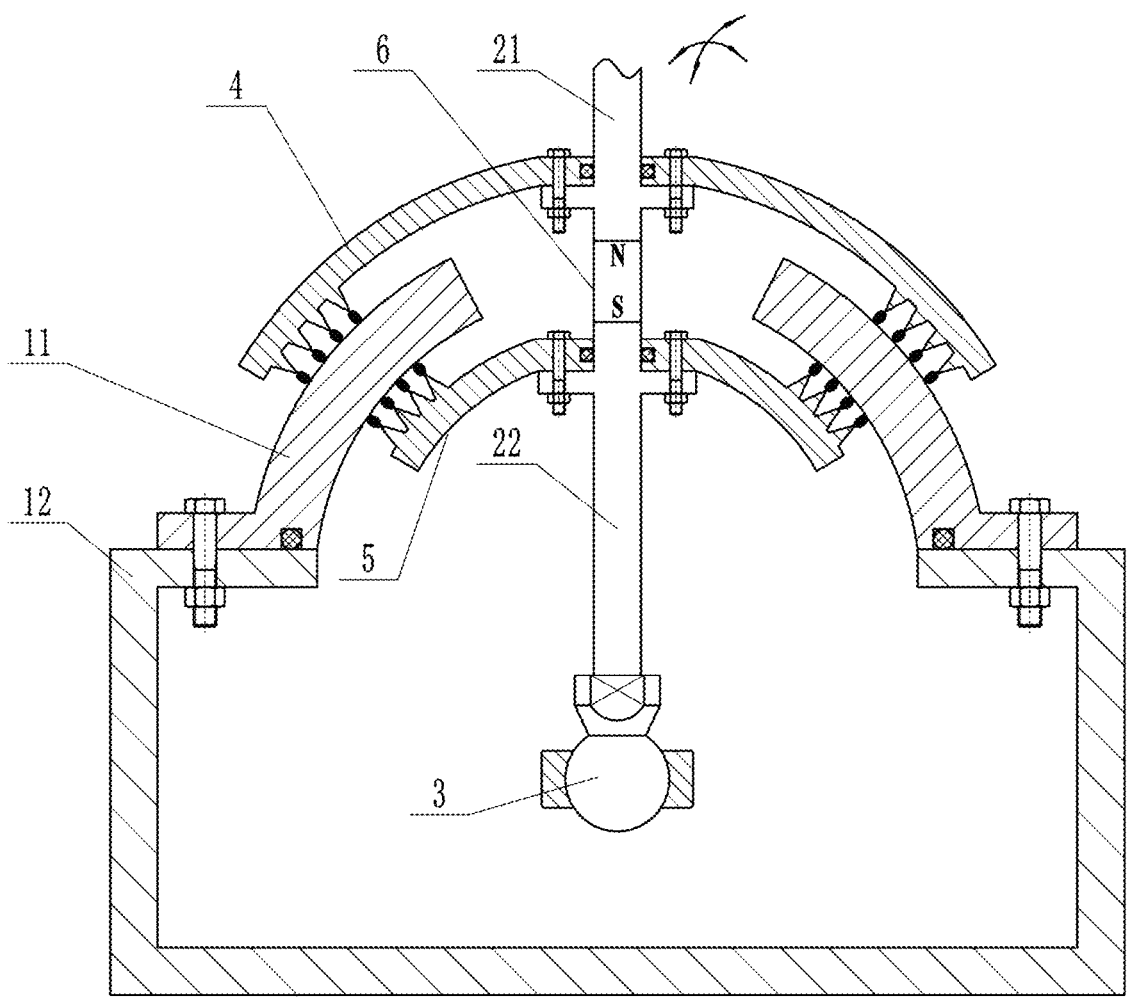
FIG. 4 is a schematic diagram of a magnetic fluid sealing device for an oscillating shaft according to embodiments of a third aspect of the present disclosure.

As shown in FIG. 4, in some embodiments, the magnetic source 6 is a permanent magnet; the oscillating shaft 2 includes a first segment 21 and a second segment 22; the permanent magnet has a first pole coupled to the first segment 21 and a second pole coupled to the second segment 22. It can be understood that the oscillating shaft 2 is a segmented structure, the permanent magnet is arranged between the two segments of the oscillating shaft 2, a magnetization direction of the permanent magnet is the axial direction of the oscillating shaft 2, and the permanent magnet may be coupled to the oscillating shaft 2 by bonding.

Figure 5:
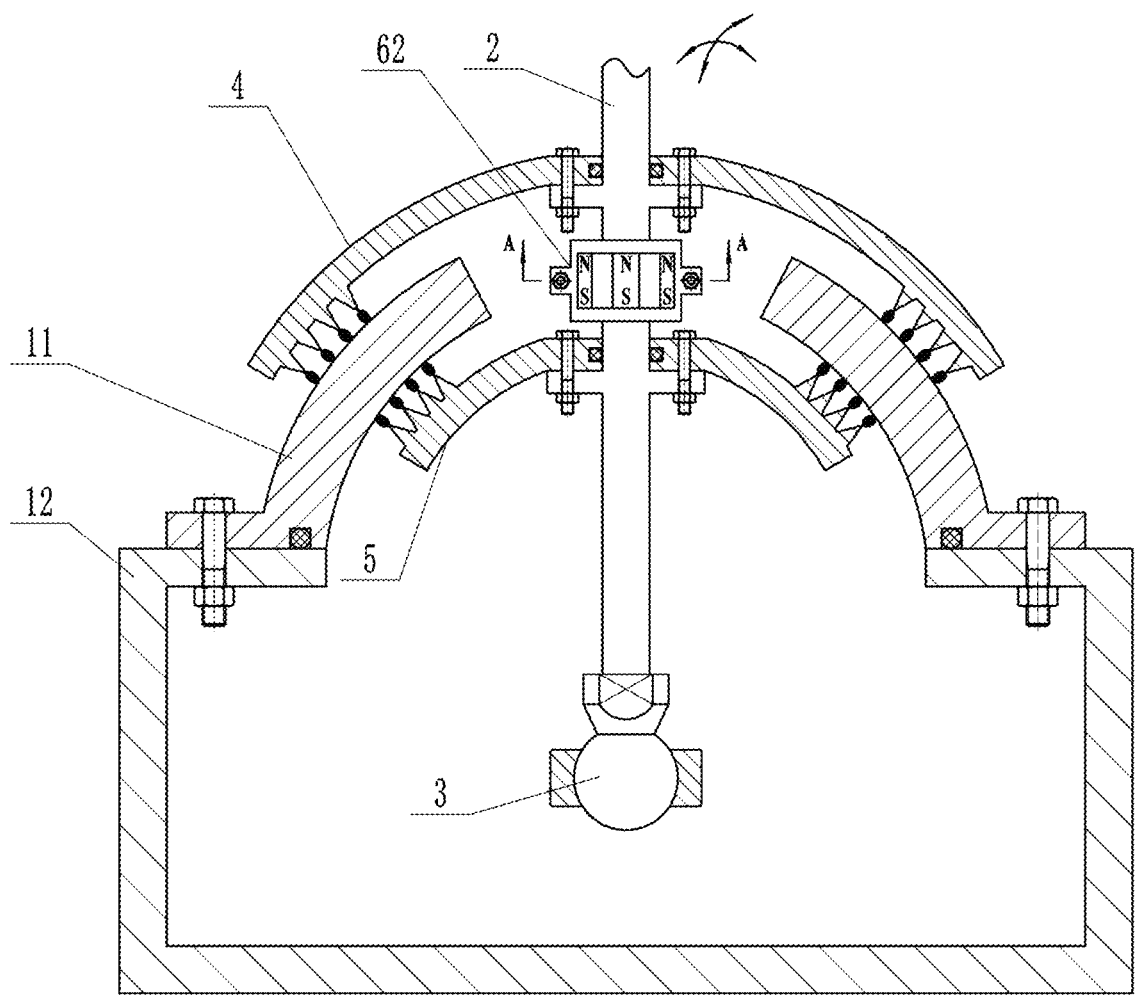
FIG. 5 is a schematic diagram of a magnetic fluid sealing device for an oscillating shaft according to embodiments of a fourth aspect of the present disclosure.

As shown in FIG. 5, in some embodiments, the magnetic source 6 includes a plurality of permanent magnets arranged at intervals along a peripheral direction of the oscillating shaft 2, and directions of magnetic fields inside the plurality of permanent magnets are the same and parallel to the axial direction of the oscillating shaft 2.

Such an arrangement, i.e., the plurality of permanent magnets being arranged in parallel, can increase the magnetic energy generated by the magnetic source 6, and the magnetic fluid 7 can be adsorbed in the sealing gaps more firmly, improving the pressure resistance capability of the magnetic fluid sealing device.

Further, the magnetic source 6 further includes a mounting bracket 62 having a cavity, i.e., the mounting bracket 62 has an annular cross section. The oscillating shaft 2 penetrates the mounting bracket 62 through the cavity of the mounting bracket 62, and the plurality of permanent magnets are arranged in the mounting bracket 62 and fixed on a peripheral side of the oscillating shaft 2. It should be noted that a plurality of recesses are arranged on an inner side of the mounting bracket 62, and each permanent magnet is stuck in one of the recesses to prevent the permanent magnet from moving.

Figure 6:
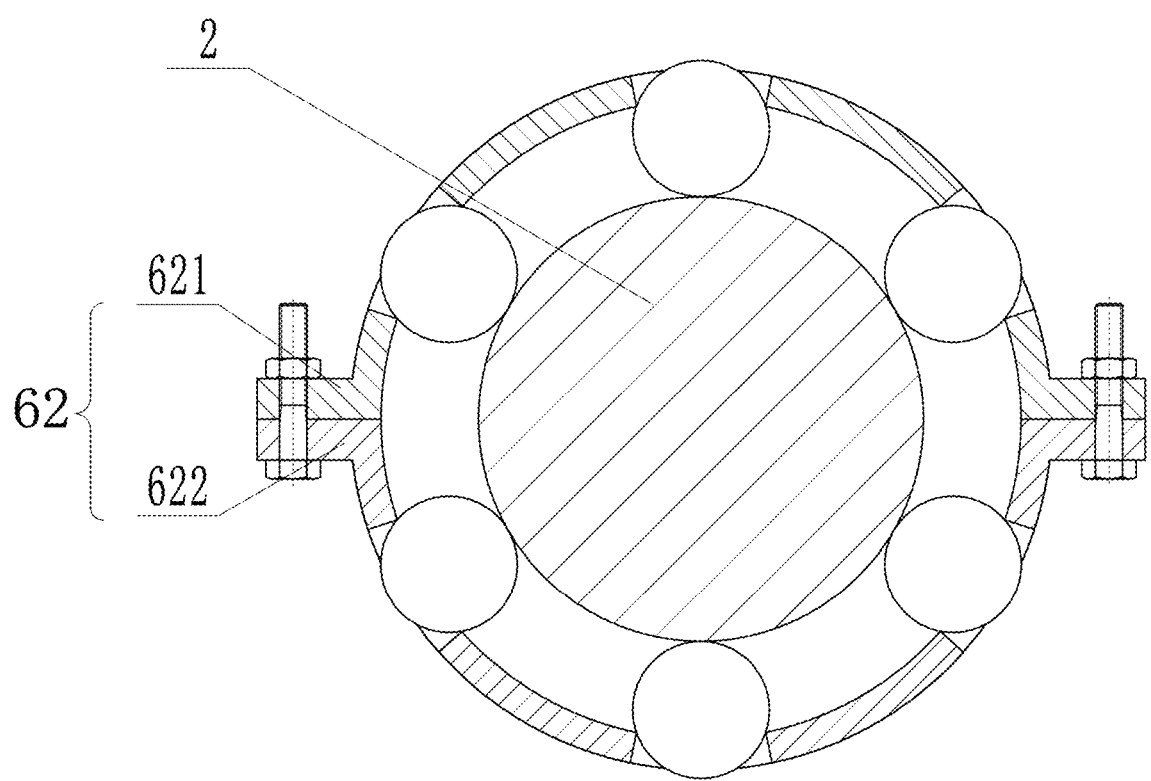
FIG. 6 is an A-A sectional view of the sealing device shown in FIG. 5.

As shown in FIG. 6, the mounting bracket 62 includes a first mounting bracket 621 and a second mounting bracket 622, and the first mounting bracket 621 and the second mounting bracket 622 are spliced together to form the cavity between the first mounting bracket 621 and the second mounting bracket 622. In other words, the mounting bracket 62 is of a split structure including the first mounting bracket 621 and the second mounting bracket 622, and the first mounting bracket 621 and the second mounting bracket 622 are spliced together to form an annular mounting bracket 62. In order to facilitate installation, the permanent magnets can be fixed in the first mounting bracket 621 and the second mounting bracket 622 before the first mounting bracket 621 and the second mounting bracket 622 are spliced together from both sides of the oscillating shaft 2 and coupled by bolts or snaps.

Figure 3:
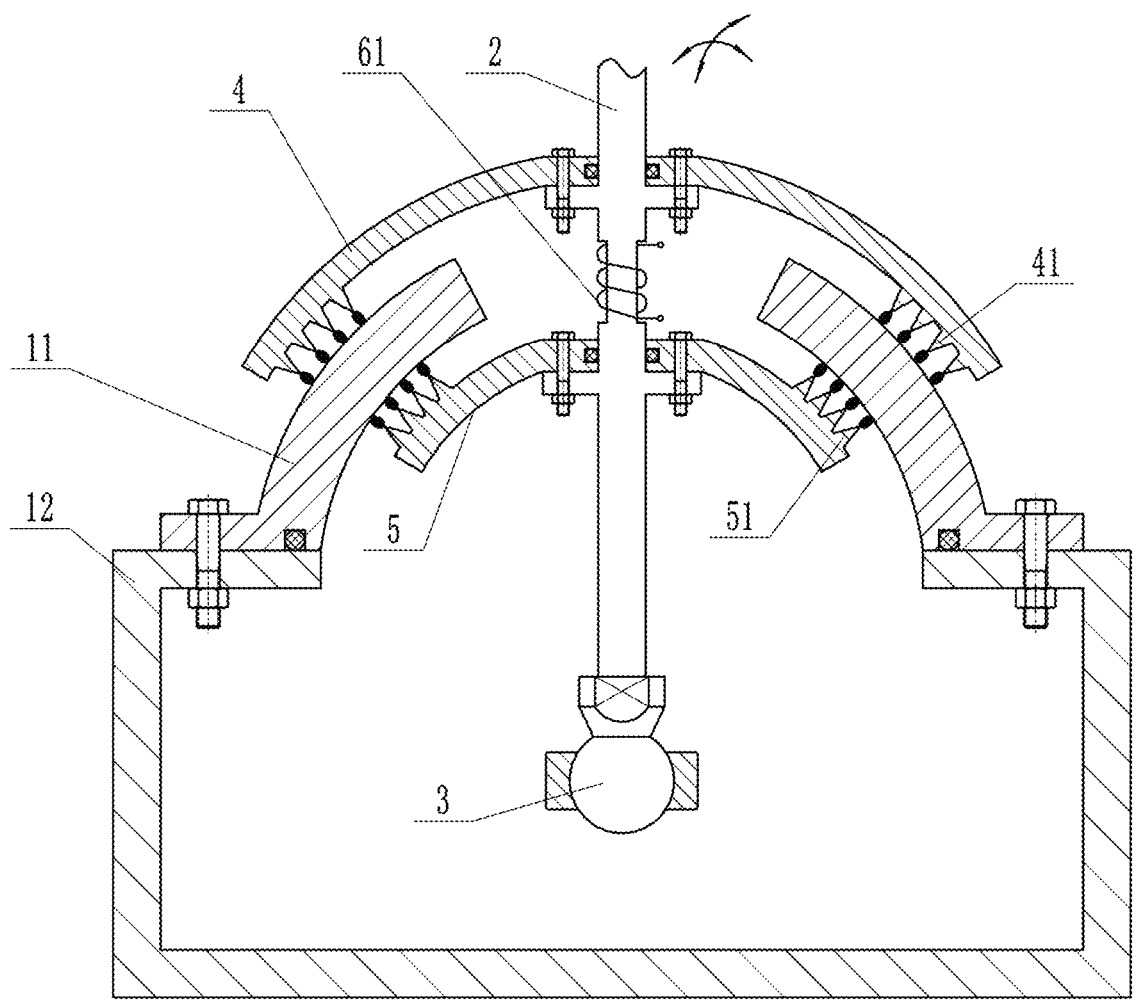
FIG. 3 is a schematic diagram of a magnetic fluid sealing device for an oscillating shaft according to embodiments of a second aspect of the present disclosure.

As shown in FIG. 3, in some embodiments, there are a plurality of first toothed rings 41 spaced apart on the first seal 4 and a plurality of second toothed rings 51 spaced apart on the second seal 5.

Each first toothed ring 41 and each second toothed ring 51 adsorb the magnetic fluid 7, and each first toothed ring 41 and each second toothed ring 51 form a single-stage seal, and the plurality of first toothed rings 41 and the plurality of second toothed rings 51 cooperate to form multi-stage seal, which has stronger pressure resistance, lower leakage rate and higher reliability than the single-stage seal.

As shown in FIG. 1, in some embodiments, the magnetic fluid sealing device for the oscillating shaft 2 also includes a first connection 43 and a second connection 53; the oscillating shaft 2 includes a first shoulder 42 and a second shoulder 52 spaced apart from each other along the axial direction of the oscillating shaft 2; the first shoulder 42 and the second shoulder 52 both have through holes or threaded holes; the first seal 4 is coupled to the first shoulder 42 through the first connection 43 and the second seal 5 is coupled to the second shoulder 52 through the second connection 53.

In some embodiments, the first connection 43 and the second connection 53 are bolts, the first connection 43 passes through the first seal 4 and is fitted in the hole of the first shoulder 42, and the second connection 53 passes through the second seal 5 and is fitted in the hole of the second shoulder 52, securing the first seal 4 and the second seal 5 to the oscillating shaft 2.

In some embodiments, the magnetic fluid sealing device for the oscillating shaft 2 further includes a first seal ring 44 and a second seal ring 54. The first seal 4 has a first through hole, and the oscillating shaft 2 runs through the first through hole and is coupled to the first seal 4. A hole wall of the first through hole has a first recess in which the first seal ring 44 is fitted. The second seal 5 has a second through hole, and the oscillating shaft 2 runs through the second through hole and is coupled to the second seal 5. A hole wall of the second through hole has a second recess in which the second seal ring 54 is fitted.

The first seal ring 44 is used to prevent the sealed substance from leaking through a gap between the first seal 4 and the oscillating shaft 2, and the second seal ring 54 is used to prevent the sealed substance from leaking through a gap between the second seal 5 and the oscillating shaft 2, improving the sealing effect of the sealing device.

As shown in FIG. 1, in some embodiments, the housing 1 also includes a chamber 12, and the ball hinge 3 is arranged in the chamber 12. The magnetic fluid sealing device for the oscillating shaft 2 also includes a third connection 13, and the ball head 11 is coupled to the chamber 12 by the third connection 13.

The housing 1 consists of the chamber 12 and the ball head 11, the chamber 12 has an inner cavity and has an opening at an end, and the ball head 11 is arranged in the opening to close the opening, which facilitates the installation of the ball hinge 3 in the housing 1 and the connection of the ball hinge 3 to the oscillating shaft 2. In some embodiments, the chamber 12 and the ball head 11 both have through holes, and the third connection 13 is a bolt that runs through the ball head 11 and the chamber 12 in turn to couple the two.

In some embodiments, the magnetic fluid sealing device also includes a third seal ring 14, the ball head 11 has a third recess on an end face in contact with the chamber 12, and the third seal ring 14 is fitted in the third recess, to prevent the medium sealed in the housing 1 from leaking through a gap between the ball head 11 and the chamber 12.

In some embodiments, the material of the oscillating shaft 2 is 2Cr13; materials of the first seal 4 and the second seal 5 are industrially pure iron DT4; the material of the ball head 11 is 2Cr13; the material of the chamber 12 is a magnetically non-permeable material, such as 304 stainless steel; the magnetic fluid 7 is a magnetic fluid 7 formed by dispersing Fe3O4 nanoparticles coated with oleic acid on the surface in kerosene.

A magnetic fluid sealing device for an oscillating shaft according to an embodiment of the present disclosure will be described below with reference to the accompanying drawings.

As shown in FIG. 3, the magnetic fluid sealing device according to the embodiment of the present disclosure includes a housing 1, an oscillating shaft 2, a first seal 4, a second seal 5, and a magnetic source 6.

The housing 1 includes a ball head 11 and a chamber 12, and the ball head 11 and the chamber 12 are coupled by a third connection 13. Inner and outer surfaces of the ball head 11 are spherical, and the ball head 11 includes an opening. The chamber 12 includes a ball hinge 3. The oscillating shaft 2 runs through the opening of the ball head 11, and an end of the oscillating shaft 2 is coupled to the ball hinge 3. The oscillating shaft 2 can swing in any direction with the ball hinge 3 as a center within the opening.

The first seal 4 is arranged on an outer side of the ball head 11, and a side surface of the first seal 4 adjacent to the ball head 11 is spherical. The second seal 5 is arranged on an inner side of the ball head 11, and a side surface of the second seal 5 adjacent to the ball head 11 is spherical. Both the first seal 4 and the second seal 5 share a common center of sphere with the ball head 11. The first seal 4 is coupled to the oscillating shaft 2 through a first connection 43, and the second seal 5 is coupled to the oscillating shaft 2 through a second connection 53. The first seal 4 and the second seal 5 swing with oscillation of the oscillating shaft 2.

There are a plurality of first toothed rings 41 spaced apart on an inner side of the first seal 4 and a plurality of second toothed rings 51 spaced apart on an outer side of the second seal 5. There is a first sealing gap between the first toothed rings 41 and the ball head 11 and a second sealing gap between the second toothed rings 51 and the housing 1, and magnetic fluid 7 for sealing is filled in the first sealing gap and the second sealing gap.

The magnetic source 6 includes a coil 61 wound around the oscillating shaft 2 and located between the first seal 4 and the second seal 5. The coil 61 is energized to generate a magnetic field along the axial direction of the oscillating shaft 2 and forms a magnetic circuit through the first seal 4, the first toothed ring 41, the magnetic fluid 7, the ball head 11, the magnetic fluid 7, the second toothed ring 51, the second seal 5, and the oscillating shaft 2.

A magnetic fluid sealing device for an oscillating shaft according to another embodiment of the present disclosure will be described below with reference to the accompanying drawings.

As shown in FIG. 4, the magnetic fluid sealing device according to the embodiment of the present disclosure includes a housing 1, an oscillating shaft 2, a first seal 4, a second seal 5, and a magnetic source 6.

The magnetic source 6 is a permanent magnet, the oscillating shaft 2 includes a first segment 21 and a second segment 22, and the permanent magnet is arranged between the first segment 21 and the second segment 22. A magnetization direction of the permanent magnet is an axial direction of the oscillating shaft 2, and the permanent magnet is coupled to the oscillating shaft 2 by bonding.

Other structures of the magnetic fluid sealing device for the oscillating shaft shown in FIG. 4 are identical to those of the embodiment shown in FIG. 3 and will not be described in detail here.

A magnetic fluid sealing device for an oscillating shaft according to still another embodiment of the present disclosure will be described below with reference to the accompanying drawings.

As shown in FIGS. 5 and 6, the magnetic fluid sealing device according to the embodiment of the present disclosure includes a housing 1, an oscillating shaft 2, a first seal 4, a second seal 5, and a magnetic source 6.

The magnetic source 6 includes a first mounting bracket 621, a second mounting bracket 622 and a plurality of permanent magnets. The plurality of permanent magnets are arranged at intervals along a peripheral direction of the oscillating shaft 2. Directions of magnetic fields inside the plurality of permanent magnets are the same and parallel to an axial direction of the oscillating shaft 2.

The first mounting bracket 621 and the second mounting bracket 622 are spliced to form an annular mounting bracket 62, and the first mounting bracket 621 and the second mounting bracket 622 may be coupled by bolts. The oscillating axis 2 runs through the mounting bracket 62, and a plurality of recesses are arranged on an inner side of the mounting bracket 62, each permanent magnet being stuck in one of the recesses.

Other structures of the magnetic fluid sealing device for the oscillating shaft shown in FIGS. 5 and 6 are identical to those of the embodiment shown in FIG. 3 and will not be described in detail here.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplification of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction between two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments within the scope of the present disclosure.

What is claimed is:

1. A magnetic fluid sealing device for an oscillating shaft, comprising:
   a housing comprising a ball head with a spherical inner surface and a spherical outer surface, the ball head having an opening, and a ball hinge being arranged within the housing;
   the oscillating shaft, running through the opening and having an end coupled to the ball hinge, the oscillating shaft being swingable with the ball hinge as a center;
   a first seal arranged on an outer side of the ball head, wherein a side surface of the first seal adjacent to the ball head is spherical, the first seal shares a common center of sphere with the ball head and is coupled to the oscillating shaft, the first seal comprises a first toothed ring arranged continuously along a peripheral direction of the first seal on a side of the first seal adjacent to the ball head, a first sealing gap exists between the first toothed ring and the ball head, and magnetic fluid for sealing is filled in the first sealing gap;
   a second seal arranged on a side of the ball head away from the first seal, wherein a side surface of the second seal adjacent to the ball head is spherical, the second seal shares a common center of sphere with the ball head and is coupled to the oscillating shaft, the second seal comprises a second toothed ring arranged continuously along a peripheral direction of the second seal on a side of the second seal adjacent to the ball head, a second sealing gap exists between the second toothed ring and the ball head, and the magnetic fluid for sealing is filled in the second sealing gap; and
   a magnetic source arranged on the oscillating shaft and located between the first seal and the second seal, wherein the magnetic source generates a magnetic field along an axial direction of the oscillating shaft.

2. The magnetic fluid sealing device according to claim 1, wherein the magnetic source comprises a coil wound around the oscillating shaft, and the coil is energized and generates a magnetic field along the oscillating shaft.

3. The magnetic fluid sealing device according to claim 1, wherein:
   the magnetic source is a permanent magnet;
   the oscillating shaft comprises a first segment and a second segment; and
   the permanent magnet has a first pole coupled to the first segment and a second pole coupled to the second segment.

4. The magnetic fluid sealing device according to claim 1, wherein:
   the magnetic source comprises a plurality of permanent magnets arranged at intervals along a peripheral direction of the oscillating shaft; and
   directions of magnetic fields inside the plurality of permanent magnets are same and parallel to the axial direction of the oscillating shaft.

5. The magnetic fluid sealing device according to claim 4, wherein the magnetic source further comprises a mounting bracket having a cavity, and the oscillating shaft penetrates the mounting bracket through the cavity.

6. The magnetic fluid sealing device according to claim 5, wherein the mounting bracket comprises a first mounting bracket and a second mounting bracket, and the first mounting bracket and the second mounting bracket are spliced and form the cavity between the first mounting bracket and the second mounting bracket.

7. The magnetic fluid sealing device according to claim 1, wherein a plurality of first toothed rings are arranged at intervals on the first seal, and a plurality of second toothed rings are arranged at intervals on the second seal.

8. The magnetic fluid sealing device according to claim 1, further comprising a first connection and a second connection, wherein:
- the oscillating shaft comprises a first shoulder and a second shoulder spaced apart from each other along the axial direction of the oscillating shaft;
- the first seal is coupled to the first shoulder through the first connection; and
- the second seal is coupled to the second shoulder through the second connection.

9. The magnetic fluid sealing device according to claim 8, further comprising a first seal ring and a second seal ring, wherein:
- the first seal has a first through hole, and the oscillating shaft runs through the first through hole and is coupled to the first seal;
- a hole wall of the first through hole has a first recess, and the first seal ring is fitted in the first recess;
- the second seal has a second through hole, and the oscillating shaft runs through the second through hole and is coupled to the second seal; and
- a hole wall of the second through hole has a second recess, and the second seal ring is fitted in the second recess.

10. The magnetic fluid sealing device according to claim 1, wherein:
- the housing further comprises a chamber, and the ball hinge is arranged in the chamber; and
- the magnetic fluid sealing device further comprises a third connection, and the ball head is coupled to the chamber by the third connection.

* * * * *